No. 859,935. PATENTED JULY 16, 1907.
A. S. GIBB.
SELF REGULATING APPARATUS FOR DELIVERING A CONSTANT SUPPLY OF WATER FOR IRRIGATION OR LIKE PURPOSES.
APPLICATION FILED APR. 18, 1907.
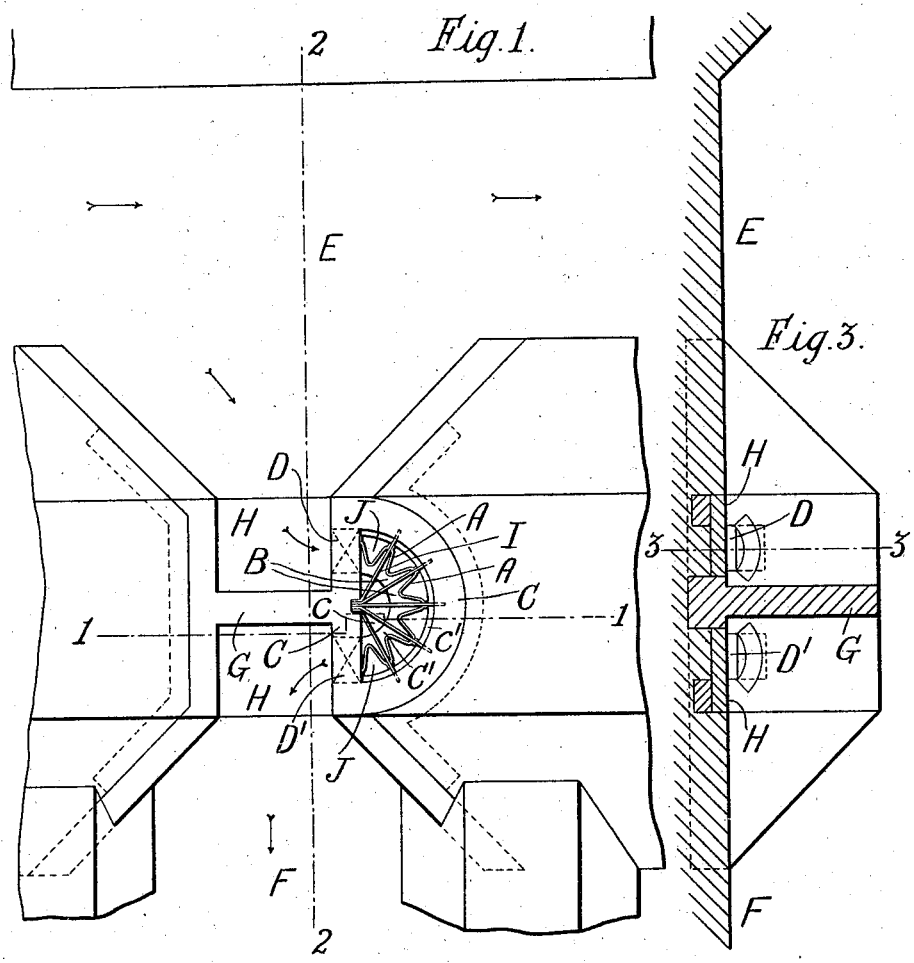
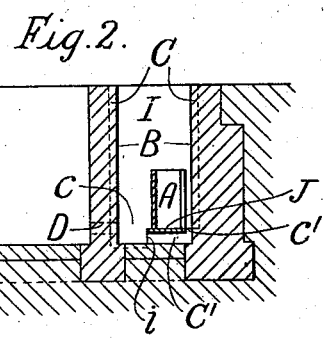
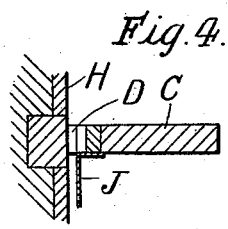
WITNESSES:
INVENTOR,
ANDREW SHIRRA GIBB,
BY
Attorney.

UNITED STATES PATENT OFFICE.

ANDREW SHIRRA GIBB, OF PUNJAB, INDIA.

SELF-REGULATING APPARATUS FOR DELIVERING A CONSTANT SUPPLY OF WATER FOR IRRIGATION OR LIKE PURPOSES.

No. 859,935.

Specification of Letters Patent.

Patented July 16, 1907.

Application filed April 18, 1907. Serial No. 368,990.

*To all whom it may concern:*

Be it known that I, ANDREW SHIRRA GIBB, a subject of the King of the United Kingdom of Great Britain and Ireland, residing at Punjab, India, have invented a Self-Regulating Apparatus for Delivering a Constant Supply of Water for Irrigation or Like Purposes, of which the following is a specification.

The object of this invention is to provide a self regulating module, or apparatus having no mechanically operating parts, through which water as for example from a distributing channel is delivered to a water course for irrigation or other purposes and whereby a constant or approximately constant discharge is maintained notwithstanding variation of the head in the distributing channel or other source of water supply.

The invention is illustrated by way of example in the accompanying drawings in which Figure 1 is a plan of the improved apparatus, Fig. 2 a vertical section on the line 1—1 of Fig. 1, Fig. 3 a vertical section on the line 2—2 of Fig. 1 and Fig. 4 a vertical section on the line 3—3 of Fig. 3.

As therein represented the improved apparatus comprises a series of sills or weirs A A fitted in compartments B B of a D-shaped chamber formed by walls C C of masonry inclosing a curved passage and formed with ports D D$^1$ through which the water is allowed to flow by way of the curved passage from the distributing channel E to the water course F direct connection between the latter and the channel E being prevented by a division wall G.

The regulation of water supply is effected by directing the water from the distributing channel E to the water course F through the curved passage, which is preferably semi-circular, in which the water rising at the outer periphery overflows the series of sills or weirs A A and rejoins the curved stream at the inner periphery and by radial circulating flow retains and renders ineffective for the purpose of delivering water, the head which may be in excess of that required and so insures a constant discharge.

The curved passage is made in the masonry in such wise that the water enters the inlet orifice or port D on one side of the division wall G, flows in a curved stream along the floor of the D-shaped chamber and is delivered through the outlet orifice or port D$^1$ on the farther side of the division wall G, the inlet and outlet being preferably at the level of the floor H. The D-shaped chamber which may be open topped is of considerable depth and in it are secured a number of radially disposed vertical plates I dividing the chamber into compartments, the plates being cut or stepped at their lower edges $i$ as indicated at Fig. 2 so as to leave a continuous curved passage C$^1$ of approximately rectangular cross section for the flow of the water, this curved passage being covered in by horizontal plates J but being open at the inner and outer peripheries $c\,c^1$ to the D-shaped chamber. Above the horizontal cover J of the curved passage C$^1$ vertical plates A A preferably bent to V-shape are fitted to serve as weirs, one being provided for each compartment.

The water entering the inlet D and flowing through the semi-circular passage C$^1$, owing to the condition of a free vortex, rises at the outer periphery more or less according as the head varies and being free to escape at the open outer periphery $c^1$ of the passage rises in each compartment which is capable of retaining a certain amount of head and overflow will only occur in the number of compartments required to take out whatever head may be in excess of actual requirements. When overflow occurs the water falls on the inner side of the weir and rejoins or flows back into the curved stream at its inner periphery $c$ under the horizontal cover plate J. When overflow is taking place simultaneously in all the compartments the maximum has been reached and the outlet ceases to give a constant discharge. The head or energy, which is in excess of that required, is thus retained in the water in the apparatus and rendered ineffective in causing variations in the quantity of water delivered and so may be considered as eliminated. The greater the head or energy the more will the water rise and overflow the weirs and as the head required for the radial flow so caused is retained within the apparatus and so rendered ineffective to a corresponding extent, the resultant is a practically constant discharge notwithstanding variations of head within limits determined largely by the dimensions of the apparatus.

Having now described my invention, what I claim and desire to secure by Letters Patent of the United States is:—

Self regulating apparatus for delivering a constant supply of water for irrigation or like purposes comprising a D-shaped chamber having ports affording communication between a water course and its source of supply, vertical plates or walls dividing the chamber into compartments and cut to form a curved passage for water flowing through the chamber and a series of sills or weirs fitted one in each compartment as and for the purpose set forth.

In testimony whereof I have signed my name to this specification in the presence of two subscribing witnesses.

ANDREW SHIRRA GIBB.

Witnesses:
PHILIP PARKER,
ROBERT M. MACGREGOR.